July 21, 1931.  C. R. SADLER  1,815,275
METHOD OF CLOSING IN THE ENDS OF A CONDUIT
Filed Jan. 20, 1925   5 Sheets-Sheet 1

INVENTOR
Cornelius R. Sadler
BY Gifford & Scull
ATTORNEYS

July 21, 1931.  C. R. SADLER  1,815,275

METHOD OF CLOSING IN THE ENDS OF A CONDUIT

Filed Jan. 20, 1925  5 Sheets-Sheet 2

INVENTOR
Cornelius R. Sadler
BY
Gifford & Scull
ATTORNEYS

July 21, 1931. C. R. SADLER 1,815,275
METHOD OF CLOSING IN THE ENDS OF A CONDUIT
Filed Jan. 20, 1925  5 Sheets-Sheet 3
Fig-4-
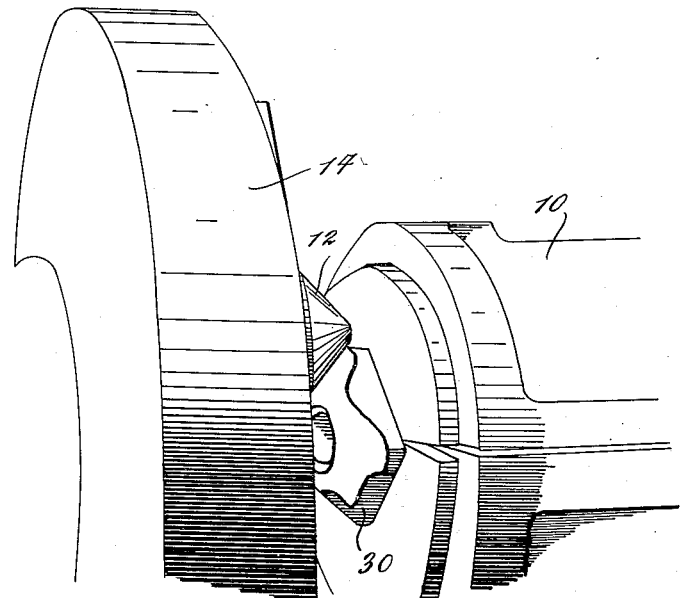
Fig-5-
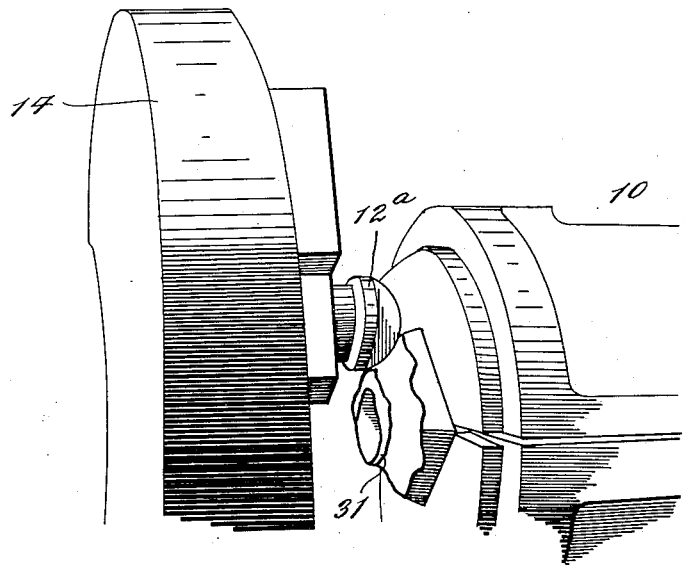
INVENTOR
Cornelius R. Sadler
BY Gifford & Seull
ATTORNEYS July 21, 1931.  C. R. SADLER  1,815,275
METHOD OF CLOSING IN THE ENDS OF A CONDUIT
Filed Jan. 20, 1925    5 Sheets-Sheet 4

INVENTOR
Cornelius R. Sadler
BY Gifford & Bull
ATTORNEYS

July 21, 1931.  C. R. SADLER  1,815,275
METHOD OF CLOSING IN THE ENDS OF A CONDUIT
Filed Jan. 20, 1925   5 Sheets-Sheet 5

INVENTOR
Cornelius R. Sadler
BY Gifford & Fenel
ATTORNEYS

Patented July 21, 1931

1,815,275

UNITED STATES PATENT OFFICE

CORNELIUS R. SADLER, OF BARBERTON, OHIO, ASSIGNOR TO THE BABCOCK & WILCOX COMPANY, OF BAYONNE, NEW JERSEY, A CORPORATION OF NEW JERSEY

METHOD OF CLOSING IN THE ENDS OF A CONDUIT

Application filed January 20, 1925. Serial No. 3,692.

Figure 1:
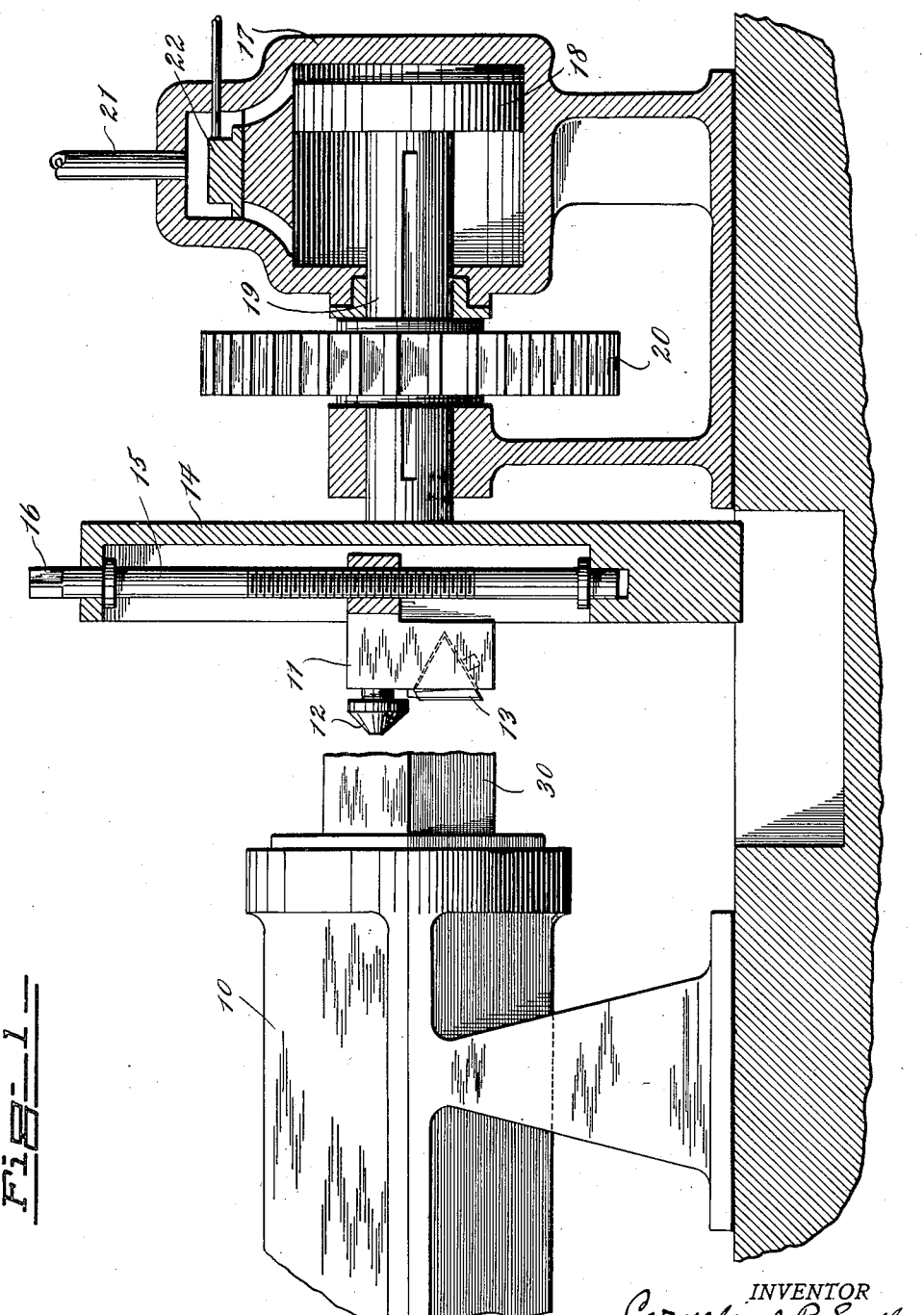
Figure 8:
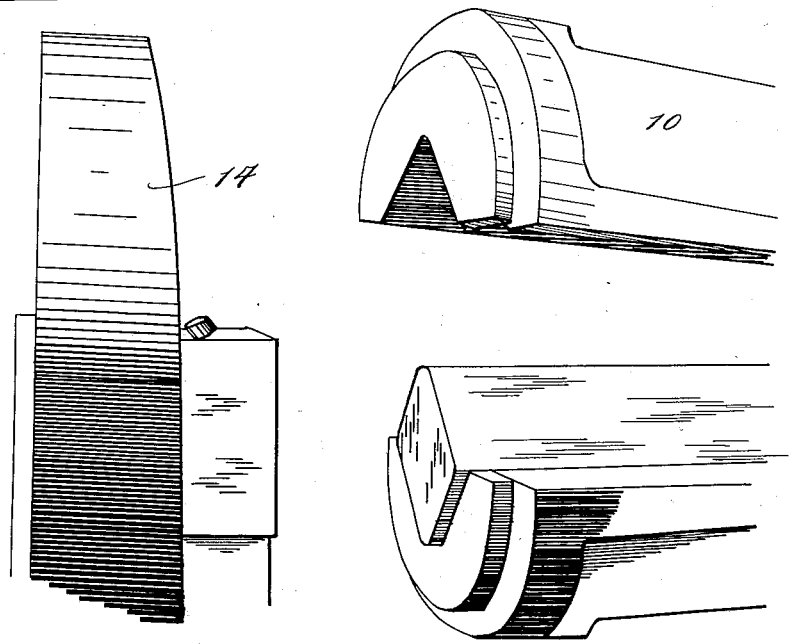
Figure 9:
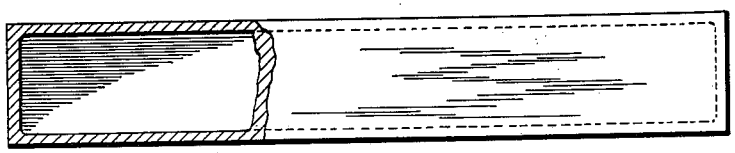
Figure 10:
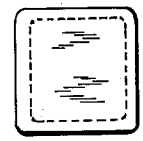

My present invention relates to the method of closing in the end of a metal conduit, and will be best understood by the following detailed description of the application of my method to the closing in of rectangular header boxes for superheaters, economizers, steam generators and the like, taken with the annexed drawings, in which Fig. 1 is an elevational view, partly in vertical section of an apparatus for carrying out the improved method; Figs. 2 to 7 inclusive, illustrate successive stages in the method and Figs. 8, 9 and 10 show the header box after the end-closing operations have been completed.

Referring to Fig. 1, 10 denotes the top of a clamping member, which is lifted up and held down by appropriate mechanism, not shown. A block 11 holds tools 12 and 13, appropriate for the upsetting operations, and is slidable in a face plate 14 by means of a shaft 15 therein, which engages a portion of block 11 in threaded relationship, as shown. It will be evident that upon turning shaft 15 by engaging the square end 16, the block 11 carrying tools 12 and 13 may be adjusted radially of the face plate 14. Means for moving the face plate 14, and consequently the tools 12 and 13 parallel to the axis of the work are provided, such means in the apparatus shown consisting of a hydraulic cylinder 17, having therein a piston 18 attached to the spindle 19, which bears the face plate 14. Spindle 19 is rotated by means of a gear 20 and a pinion not shown. Water or other fluid under pressure is admitted to the cylinder through pipe 21, the direction of movement of piston 18 being controlled by slide valve 22 operated through appropriate mechanisms not shown.

In carrying out the improved method, the end 30 of the box or conduit to be closed and which, in the embodiment illustrated, is substantially rectangular in cross-section is first heated to flanging temperature and the box placed within the vise 10, preferably exposing only so much of the end 30 as will afford sufficient metal to effect the closure. The conically shaped tool 12 having been placed within block 11, the former is brought into the positions shown in Fig. 2, i. e., where the nose of tool 12 is just within the end 30. The face plate 14, whose axis is substantially coincident with that of the work, is now rotated, during which rotation face plate 14 is brought further toward the work until the end 30 of the box has assumed a more or less rounded appearance. The object of this step is to convert the square end into an approximately round one, whereupon the actual closing-in operations may be begun.

The next step consists in applying pressure, while rotating face plate 14, externally of the end 30 in a direction radially inward and axially of the conduit, using the same tool 12 until the end becomes tapered and partially closed, the end of the conduit having the appearance of Fig. 4. This operation is accomplished by the operator from time to time retracting the face plate 14 and moving the block 11 further toward the center by turning shaft 15.

Figure 6:
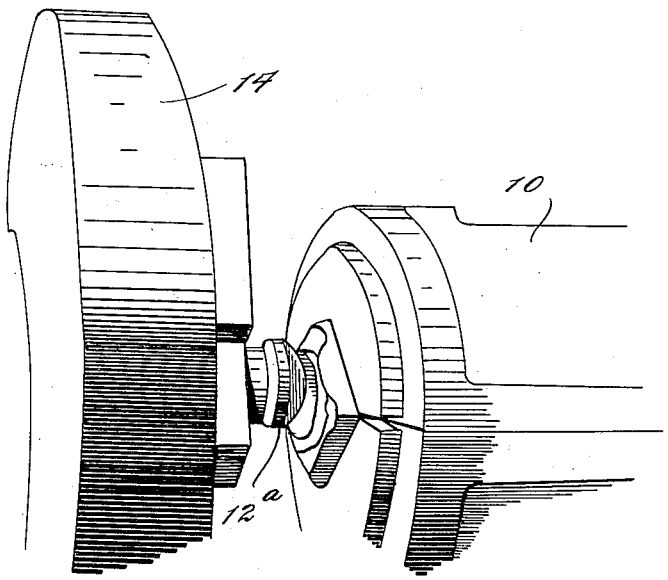
Figure 7:
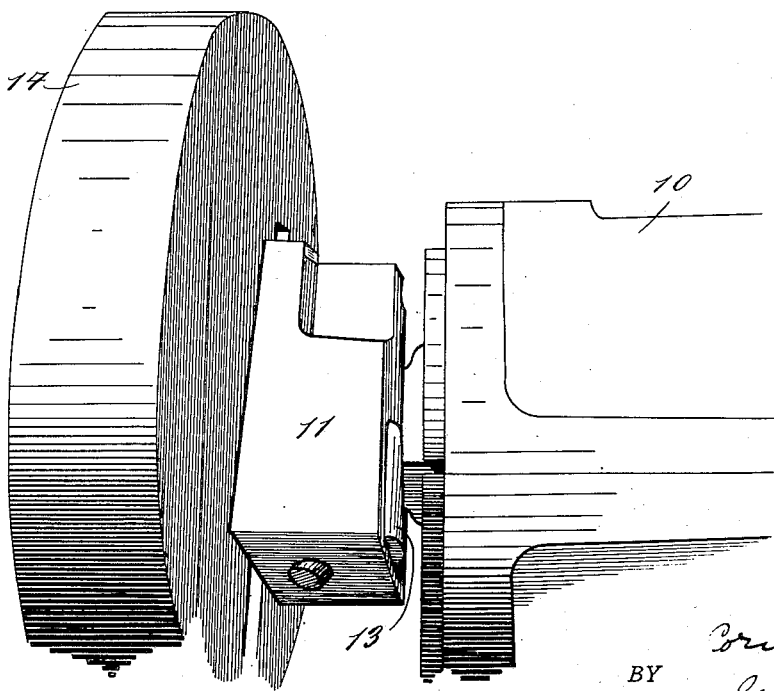

After the end 30 has become tapered and partially closed in this manner, the conically shaped tool 12 is removed from block 11 and a button shaped tool 12ª substituted. By means of this tool, pressure is applied in a similar direction as in the preceding step, the operator gradually working the tool further toward the center. At first, the effect of tool 12ª, is to produce a kind of neck 31, due to the rotation of the face plate 14 and the continued pressure exerted in an axial direction, but as the tool is brought further toward the center of the conduit, this neck becomes flattened out, as shown in Fig. 6, and the end 30 becomes closed.

It now remains to smooth off the closure thus effected, and this is accomplished by means of the conically shaped tool 13, tool 12ª having been removed. Tool 13 as shown, has its axis inclined so as to bring its surface tangent to a plane parallel to face plate 14, the angle of the cone being such as to enable the tool to be rotated against the now closed end 30, without any substantial amount of slip between the contacting surfaces. The rolling of the end 30 by means of tool 13 is continued until the surface of the latter is substantially plane and at right angles to the sides of the conduit, the face plate 14 being advanced until it is substantially flush with the face of the vise. The finished end is shown in Figs. 8 and 9.

It will be understood that the metal composing the end 30 will be maintained at a flanging temperature throughout the upsetting operations, the end being reheated if necessary. I have found that greatly improved results will be had if the direction of rotation of the face plate 14 be reversed from time to time, as, for example, after each stage as illustrated in Figs. 1 to 6 inclusive, or oftener, if it be found necessary. Reversing the relative rotation between the face plate 14 and the conduit is advantageous where the conduits are formed from a plate and have a welded joint extending longitudinally thereof, since the reversal of rotation serves to prevent the welds from opening up, or at least reduces the tendency of opening up to a minimum as compared with rotation in one direction only of the plate 14 relative to the conduit. The reverse rotation is of particular advantage where the conduit is polygonal in cross-section as the described operation then leaves the ends of the conduit undistorted. When the conduit is rectangular in cross-section as illustrated or of other polygonal form, rotation of the plate 14 in one direction only relative to the conduit causes the corners of the conduit to be drawn over in the direction of rotation, the sides of the conduit at the end being depressed or cupped slightly due to the action of the corners of the conduit being drawn in the direction of rolling, thereby leaving the end of the conduit distorted. It is, of course, of particular advantage to have the end of the conduit undistorted when the same is to be used as a header for a steam boiler and in other locations where it is to be nested or placed adjacent to other headers, since with the distorted end it would not be possible to place the sides of the conduit in close engagement.

By practicing the method I have above described, a closure of the header may be effected, as shown in Fig. 9, in which the metal forming the closure is of substantially uniform thickness and substantially the same as that of the body of the box. Furthermore, such closed end has the neat appearance of a closure formed by the usual method of welding on a separate piece of metal. If desired, a small hole may be bored in the center of the closure whereby the character and thickness of the metal can be ascertained, after which the hole may be threaded and plugged.

Figure 2:
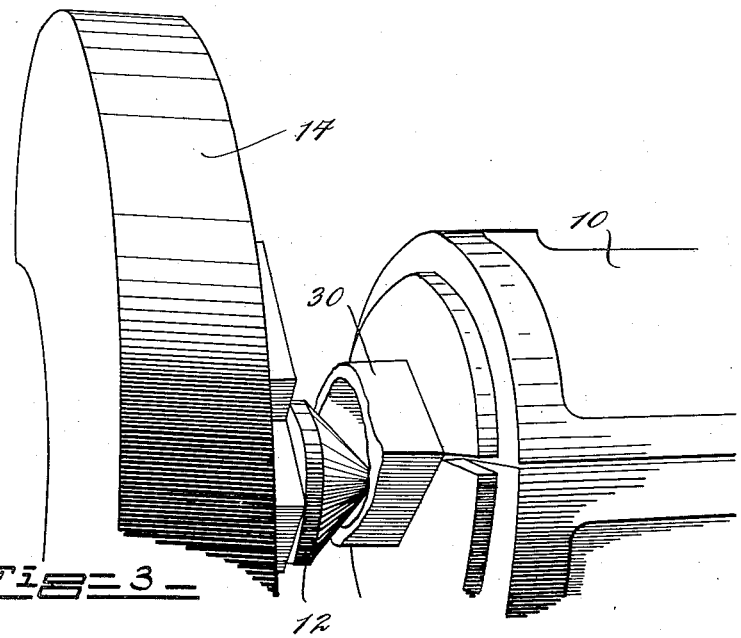
Figure 3:
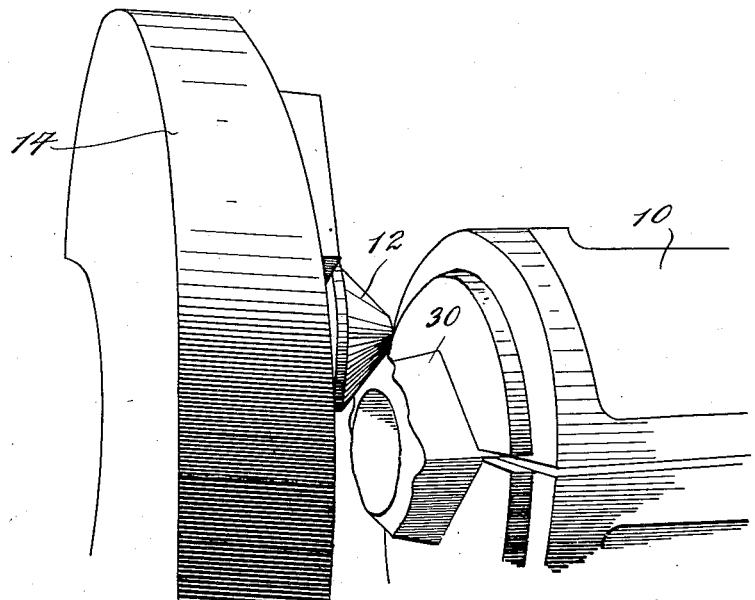

When it is desired to close the end of a round conduit the preliminary step illustrated in Fig. 2 is omitted. Instead of effecting a flat closure by using the conical roller 13, the end may be rounded by the use of rollers of appropriate shape.

A further type of end closure is possible by varying somewhat the latter steps of the method. Referring to Fig. 5 the neck 31 may be accentuated simply by increasing somewhat the axial advance of the button shaped tool 12ª against the work and the remaining steps omitted. In this way a hollow neck is produced which may be machined and threaded. If desired, the neck may be made eccentric to the axis of the conduit by off-setting the axis of the face plate 14 with respect to that of the conduit the desired amount.

It will be apparent that pressure is applied by means of the tool to the conduit or work, which pressure is localized over a small part of the arc of a circle, and sufficient in amount to cause the metal to flow. It will also be apparent that the form of the finished product bears no relation to the form of the tool as is the case with dies, the form of the end of the conduit being determined by the movement and pressure of the tool rather than by the form thereof.

The term edge as here used refers to the end edge, both terms being intended to refer to that part of the metal of the blank which is positioned between the inner and outer peripheries of the blank. The term blank refers to the body of metal as it exists prior to the completion of the metal working herein set forth.

I claim—

1. The method of closing in the end of a conduit non-circular in cross section which consists in producing relative rotation between the conduit and a tool, and applying to the end of said conduit by the tool pressure localized over a small part of the arc of a circle, the pressure first being applied inside of the conduit and causing the metal to flow outwardly, and then applying pressure outside of the conduit and causing the metal to flow inwardly.

2. The method of closing in the end of a conduit which consists in producing relative rotation between the conduit and a tool, and applying to the end of said conduit by the tool pressure localized over a small part of the arc of a circle, the pressure first being applied inside of the conduit and causing the metal to flow outwardly, and then applying pressure outside of the conduit and causing the metal to flow inwardly, and reversing the direction of said relative rotation of the tool and conduit during the operation.

3. The method of manufacture of thick walled steel pressure vessels capable of withstanding high fluid pressure of the vessel bursting type, the method comprising, heating a tubular blank to working temperature, applying pressure with planetary motion to the edge only of the extended blank end, regulating that applied pressure so as to limit it to small and continuing amounts in such a manner that the edge is slightly upset at the start, that upset being at an incline toward the extended axis of the tube thus causing the upset metal to flow and form a radially inwardly directed upset flange, and further upsetting the flange and upset edge by planetary forging in a continuous manner to gradually flow the metal from the upset edge into the flange until said flange closes the tube end forming an upset end wall of the pressure vessel.

4. The method of manufacture of thick walled steel pressure vessels capable of withstanding high fluid pressures of the vessel bursting type, the method comprising, heating a tubular blank, applying pressure to the edge only of the extended blank end, regulating that applied pressure so as to limit it to small amounts and continuing the pressure applications progressively around the end of the blank in such a manner that the edge is slightly upset at the start, that upset being at an incline toward the extended axis of the tube thus causing the upset metal to flow and form a radially inwardly directed upset flange, and further upsetting the flange and upset edge by progressively forging in succession around the end of the blank in a continuous manner to gradually flow the metal from the upset edge into the flange until said flange closes the tube end forming an upset end wall of the pressure vessel.

5. The method of end closing thick walled tube blanks comprising applying an upsetting force to one portion of the end edge of said blank to upset that edge and continuing the application of said force around the edge to upset the same in such a manner that the edge is slightly upset at the start, the upset being at an incline toward the extended axis of the blank, thus causing the upset metal to flow and form a radially inwardly directed upset flange, and further upsetting the flange and upset edge to gradually flow the metal from the upset edge into the flange until said flange closes the blank end.

CORNELIUS R. SADLER.